US012052803B2

(12) United States Patent

Nietfeld

(10) Patent No.: US 12,052,803 B2
(45) Date of Patent: Jul. 30, 2024

(54) CONTROL AND/OR REGULATING SYSTEM, CIRCUIT ARRANGEMENT AND PROCEDURE FOR ACTUATING LIGHT-EMITTING DIODES (LEDS) IN AN LED FIELD

(71) Applicant: Hella GmbH & Co. KGaA, Lippstadt (DE)

(72) Inventor: Dieter Nietfeld, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 66 days.

(21) Appl. No.: 17/310,952

(22) PCT Filed: Feb. 18, 2020

(86) PCT No.: PCT/EP2020/054219

§ 371 (c)(1),
(2) Date: Sep. 1, 2021

(87) PCT Pub. No.: WO2020/182427

PCT Pub. Date: Sep. 17, 2020

(65) Prior Publication Data

US 2022/0353964 A1 Nov. 3, 2022

(30) Foreign Application Priority Data

Mar. 8, 2019 (DE) ..................... 10 2019 105 953.4

(51) Int. Cl.
*H05B 45/32* (2020.01)
*H05B 45/14* (2020.01)
*H05B 45/325* (2020.01)

(52) U.S. Cl.
CPC ........... *H05B 45/14* (2020.01); *H05B 45/325* (2020.01)

(58) Field of Classification Search
CPC ........ H05B 45/00; H05B 45/10; H05B 45/14; H05B 45/30; H05B 45/32; H05B 45/325; H05B 45/46; H05B 45/52
See application file for complete search history.

(56) References Cited

U.S. PATENT DOCUMENTS 5,736,881 A * 4/1998 Ortiz ....................... H01S 5/042 327/515
9,839,083 B2 * 12/2017 van de Ven ............ H05B 45/20
(Continued)

FOREIGN PATENT DOCUMENTS

DE 102008060042 A1 * 9/2009 ............ F21S 48/115
DE 102008060042 A1 9/2009
(Continued)

*Primary Examiner* — Thai Pham
(74) *Attorney, Agent, or Firm* — Husch Blackwell LLP

(57) ABSTRACT

A control and/or regulating system is provided for controlling and/or regulating an LED field with n LEDs, with outputs at which control and/or regulating signals for controlling and/or regulating controllable switching elements can be tapped. The control and/or regulating system can be used to define activation times and/or deactivation times of impulses through the control signals and/or regulating signals and one and/or several controllable switching elements can be actuated during the determined impulses for closing or opening. A number of k groups can be specified or has been specified. Each LED is allocated to one of the k groups such that each one of the k groups $m_j$ contains LEDs, where $1 \le j \le k$ and is $\Sigma_{j=1}^{k} m_j = n$ and the determined activation times and/or deactivation times of the impulses of every single group has been specified by the control and/or regulating system such that the impulses overlap as little as possible.

18 Claims, 5 Drawing Sheets

(56) References Cited

U.S. PATENT DOCUMENTS

| | | | | |
|---|---|---|---|---|
| 11,438,982 | B2 * | 9/2022 | Song | G09G 3/32 |
| 2007/0216320 | A1 | 9/2007 | Grivas et al. | |
| 2008/0129224 | A1 | 6/2008 | Shih et al. | |
| 2010/0001944 | A1 * | 1/2010 | Seong | G09G 3/342<br>345/102 |
| 2011/0031895 | A1 * | 2/2011 | Liu | H05B 45/44<br>315/294 |
| 2012/0187762 | A1 * | 7/2012 | Kim | H03K 7/08<br>307/32 |
| 2014/0111102 | A1 * | 4/2014 | Angelin | H05B 45/375<br>315/186 |
| 2014/0306530 | A1 * | 10/2014 | Theiler | H02M 3/1584<br>307/31 |
| 2017/0367159 | A1 * | 12/2017 | Welten | H05B 45/10 |
| 2021/0204376 | A1 * | 7/2021 | Muehlschlegel | H05B 45/37 |
| 2022/0174797 | A1 * | 6/2022 | Hagemeier | H05B 45/10 |

FOREIGN PATENT DOCUMENTS

| | | | |
|---|---|---|---|
| DE | 102010046795 | A1 | 3/2012 |
| DE | 102012219817 | A1 | 4/2014 |
| DE | 102015210189 | A1 | 12/2016 |
| WO | 2018047915 | A1 | 3/2018 |

* cited by examiner

CONTROL AND/OR REGULATING SYSTEM, CIRCUIT ARRANGEMENT AND PROCEDURE FOR ACTUATING LIGHT-EMITTING DIODES (LEDS) IN AN LED FIELD

CROSS REFERENCE

This application claims priority to PCT Application No. PCT/EP2020/054219, filed Feb. 18, 2020, which itself claims priority to German Application No. 10 2019 105953.4, filed Mar. 8, 2019, the entirety of both of which are hereby incorporated by reference.

FIELD OF THE INVENTION

The invention relates to a control and/or regulating system for controlling and/or regulating an LED field with outputs at which control and/or regulating signals for controlling and/or regulating controllable switching elements can be tapped, where activation times and/or deactivation times of impulses can be defined through the control signals and/or regulating signals and one and/or several controllable switching elements can be actuated during the determined impulses for closing or opening. A circuit arrangement and a procedure for operating the circuit arrangement.

BACKGROUND OF THE INVENTION

With LED fields, the luminance of each individual LED is controlled through a pulse width modulated (current) signal with an impulse with a pulse width of PW=0-100%.

The procedure generally involves the LEDs being activated at the beginning of a clock cycle of the PWM cycle and deactivated after the activation period selected for reaching the desired luminance. This means that all LEDs are activated at the same time, deactivation can take place at a different deactivation time for each LED, depending on the pulse width of the impulse.

This leads to a strong pulse current load in the supply to such an LED field, especially at the activation time $t_{ein}=0$. This, in turn, increases the demands placed on the supply to these systems and can lead to problems with the EMC.

Such an LED field can be found, for example, in newly developed LED headlamps with several tens of thousands of LEDs within an LED field. Here it is desirable to reduce the maximum level of current in the system and to even out the current curve overall in order to achieve better EMC conditions and to facilitate a more favorable design of the supply to the LEDs.

This is the point at which the invention comes in.

BRIEF SUMMARY OF THE INVENTION

The problem underlying the invention involved improving a control and/or regulating system of the kind described at the beginning of this document in such a way that the desired light distribution is achieved and, at the same time, the dynamism of the overall current and peak current is reduced.

In accordance with the invention, this task is solved by a control and/or regulating system for controlling and/or regulating an LED field with n LEDs with outputs at which control and/or regulating signals for controlling and/or regulating of controllable switching elements can be tapped, where the control and/or regulating system can be used to define activation times and/or deactivation times of impulses through the control signals and/or regulating signals and one and/or several controllable switching elements can be actuated during the determined impulses for closing or opening, where a number of k groups can be specified or has been specified, each LED is allocated to one of the k groups such that each one of the k groups $m_j$ contains LEDs, where $1 \leq j \leq k$ and $\Sigma_{j=1}^{k} m_j = n$ apply and the determined activation times and/or deactivation times of the impulses of every single group has been specified by the control and/or regulating system such that the impulses overlap as little as possible.

The inventive control and regulating system makes it possible to select the activation times and deactivation times of the LEDs in such a way that not all LEDs are activated at the same time at the beginning of the clock cycle.

This measure reduces the maximum current in the system and flattens the current curve.

One option is for the luminance of every single LED $m_j$ of one of the k groups to be controlled by setting a pulse width of the impulse from 0-100% of a clock cycle and/or setting an amplitude of the impulse.

Furthermore, another option is for the activation time and/or deactivation time of the impulse to be determined for every LED $m_j$ of a group depending on the pulse width and/or the amplitude of the impulse.

One preferable option is for the determined activation times and/or deactivation times of the impulses to be within a specified clock cycle.

The inventive control and regulating system provides an option that it can be determined, or it has been determined, which impulses have a pulse width of <100%, where the activation time and the deactivation time for each of these impulses can be specified at the beginning or the end of a clock cycle, which impulses have a pulse width of <100%, impulses with pulse widths<100% can be combined to summated impulses as long as the sum of the pulse width<=100% and the activation time and/or deactivation time of the impulse can be specified or has been specified such that the summated impulse lies at the middle of a clock cycle.

The sequential arrangement of the impulses, the aggregate pulse widths of which should come close to 100% makes it possible to create a more even current requirement. Similarly, the summated impulse is placed at the middle of a clock cycle. This shifts a maximum current requirement, which cannot always be avoided, likewise to the middle of a clock cycle. The waveform of the current generated in this way leads to a situation where the it is possible to avoid high peak currents at the beginning of a clock cycle and rapid and steep rises in current that can lead to EMC problems.

There is the possibility that the number of groups amounts to $2 \leq k \leq n$ and the beginning of a clock cycle can be actuated at staggered time intervals $\Delta t_2 \ldots \Delta t_k$.

Advantageously, the time period $\Delta t$ can be determined using the equation $\Delta t$=Taktperiode/k.

In this case, the beginning of the clock cycle can be determined to be staggered by 1/k clock cycles. This makes it possible to achieve a situation where the power consumption of the LED field becomes more even. This may permit lower demands to be placed on the supply to the LED field.

Furthermore, the invention relates to a circuit arrangement for controlling and/or regulating an LED field. The inventive circuit arrangement features a control and/or regulating system, a current source and an LED field, where the LED field features at least two series circuits each of which comprises at least one LED and a controllable switching element allocated to the LED, where a control connection of each controllable switching element is connected with an output of the control and/or regulating system.

One option in this context is for the current source to be regulated by the control and/or regulating system such that the power corresponds to the current requirement of the LEDs, the allocated controllable switching elements of which are closed.

Furthermore, another option is for the LED field to be divided into 2≤k≤n groups.

Due to the division into at least two groups, there is the possibility of staggering the beginning of a clock cycle for each group by a time interval of Δt and exploiting the benefits already described.

The procedure for operating an inventive circuit arrangement features at least the following steps: the control and/or regulating system checks which impulses have a pulse width=100%, the activation time and the deactivation time for each of these impulses is set to the beginning or the end of a clock cycle, the control and/or regulating system checks which impulses have a pulse width<100%, impulses with pulse widths<100% can be combined to summated impulses as long as the sum of the pulse width<=100%, the control and/or regulating system determines the activation time and/or deactivation time of the impulse for each LED in each group such that the summated impulse is at the middle of a clock cycle, and the control and/or regulating system actuates the controllable switching elements for the determined activation time and/or deactivation time of the impulses for closing or opening.

Similarly, one option is for the procedure for operating an inventive circuit arrangement, which is especially suitable for performing prior to performance of the procedure described above, to feature at least the following steps: the control and/or regulating system determines the impulse widths for each LED in a group or the impulse widths are transferred to the control and/or regulating system, the control and/or regulating system determines the greatest impulse width, the greatest impulse width is compared with the clock cycle, if the greatest impulse width is shorter than the clock cycle, a factor is calculated that increases such impulse width to 100% of the clock cycle, all further impulse widths of the impulses for each LED in a group are increased by the same factor, and the necessary current requirement of each impulse is multiplied by the reciprocal factor.

The luminance distribution, which is mainly determined in advance, remains the same with this procedure. Due to the increase in the pulse widths, and the reduction in current thereby made possible, the total current requirement of the LED field can be made more even over a clock cycle. It is similarly possible to reduce the maximum current.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
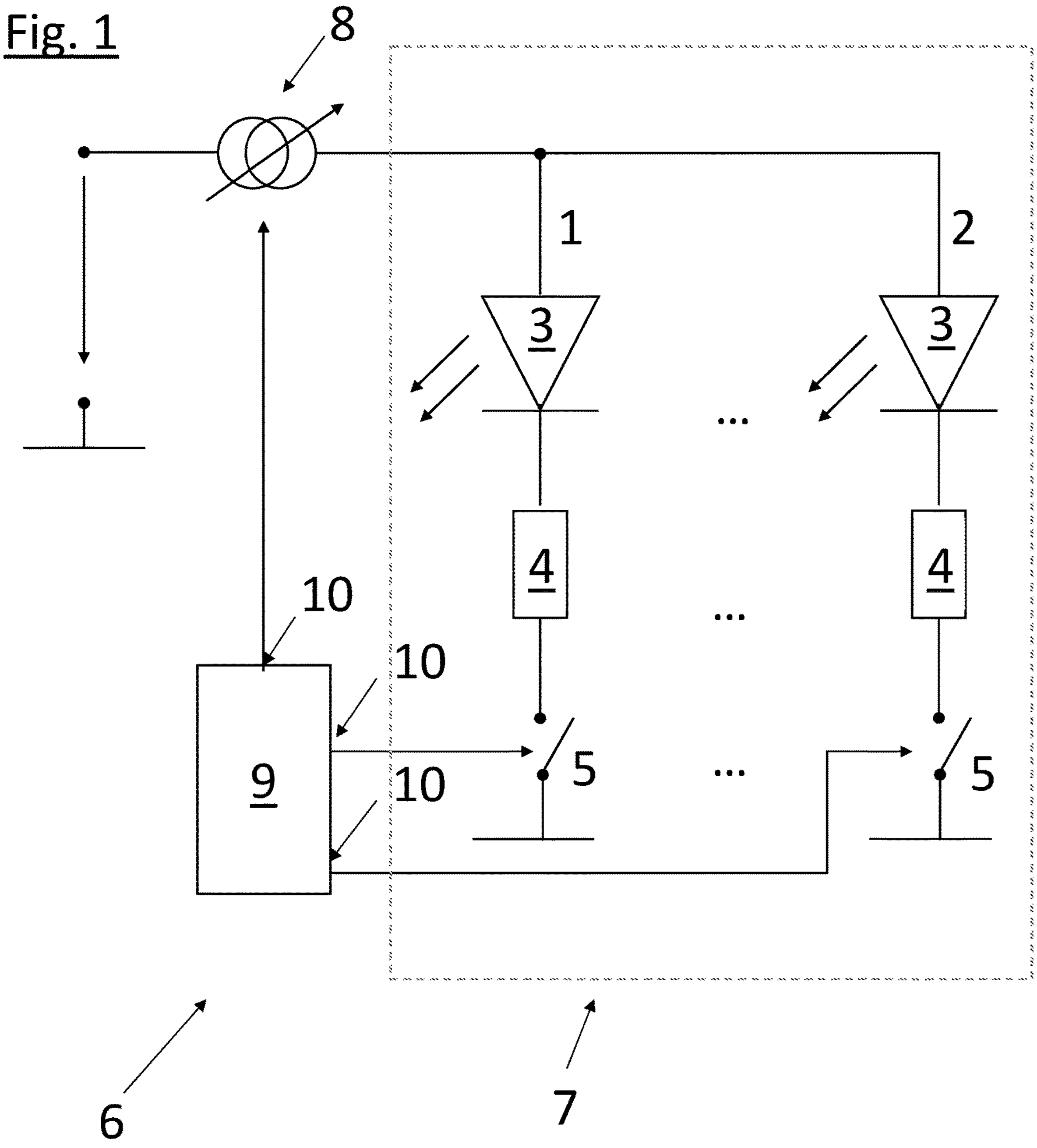
FIG. 1 is a block circuit diagram of the inventive arrangement.

The inventive circuit arrangement 6 shown in FIG. 1 comprises an LED field 7 of two series circuits 1, 2. Each series circuit 1, 2 comprises an LED 3, a resistor 4 and a controllable switching element 5.

In accordance with the indexes of the designations of the components, reference will be made in the following to the first series circuit 1 and the second series circuit 2.

The series circuits 1, 2 are wired in parallel. The LEDs 3 are arranged within the series circuits 1, 2 in such a way that their anodes make contact at a shared node. The resistors 4 are arranged between the diodes 3 and the controllable switching elements 5. In addition to the LED field 7, the inventive circuit arrangement 6 comprises a current source 8. The current source 8 is a controllable current source.

Furthermore, an inventive circuit arrangement 6 is intended to have an inventive control and/or regulating system 9. The control and/or regulating system 9 has several outputs 10. Through these outputs 10, the control and/or regulating system 9 is connected with the controllable current source 8 and the controllable switching elements 5 of the LED field 7.

First outputs 10 of the control and/or regulating system 9 are connected with control connections of the controllable switching elements 5 of the series circuits 1 and 2 of the LED field 7. Control impulses can be transmitted to the switching elements 5 via these first outputs 10 in order to close or open the switching elements. A second output 10 is connected with the controllable current source 8. Through this second output 10, a signal can be transmitted from the control and/or regulating system 9 to the controllable current source 8 in order to set the current to be supplied by the current source 8. The control and/or regulating system 9 is set up such that the LEDs 3 have a desired luminance.

This is achieved by a controllable switching element 5 allocated to an LED 3 being actuated for closing within a clock cycle until the LED 3 provides the desired luminance.

This impulse is described with a pulse width in % of a clock cycle and is between 0-100%. Activation and deactivation is performed at such a high frequency that it cannot be seen by the human eye.

Figure 2:
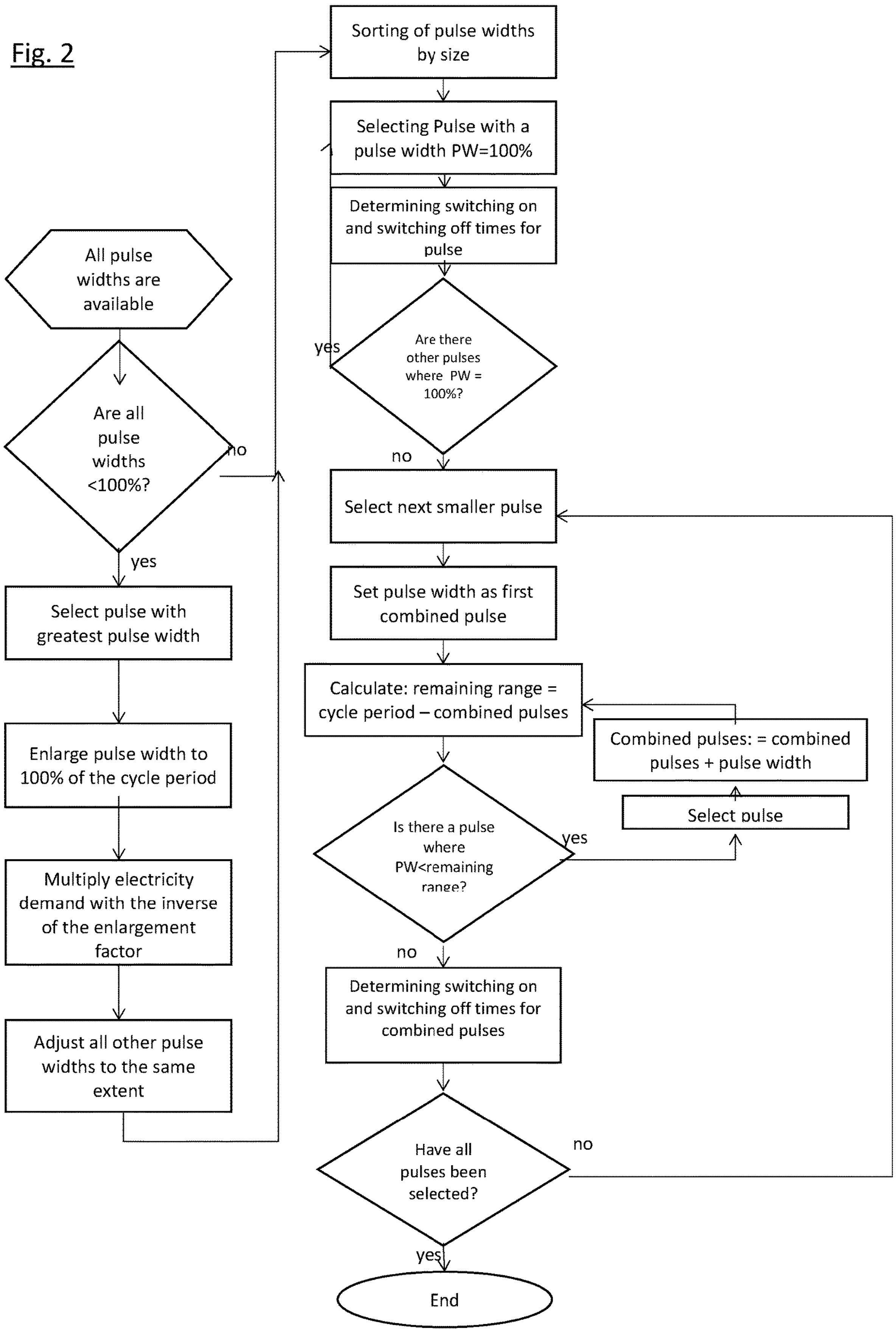
FIG. 2 is a flow diagram to demonstrate how the activation times and the deactivation times are determined.

FIG. 2 shows a flow diagram to demonstrate how the activation times and the deactivation times are determined. As a preparatory measure, all impulse widths are available for the process.

At the beginning of the flow diagram, differentiation is made as to whether there are any PW<100%. If the answer to the inquiry is "yes", the impulse with the widest impulse width is selected.

Impulse width is increased to 100% of the clock cycle. The current requirement is subsequently multiplied by the reciprocal factor of the increase. All further impulse widths are adjusted by equal amounts.

After running through this loop, impulse widths PW=100% are available by definition. The flow diagram then continues at the position actuated if the above inquiry is answered with "no".

The impulse widths are sorted by size. Subsequently, an impulse with the pulse width PW=100% is selected and the activation time and deactivation time for this impulse are determined. Normally, the activation time will be the beginning of the clock cycle and the deactivation time the end of the clock cycle.

A check is subsequently performed as to whether a further impulse with PW=100% is available.

If the answer to the inquiry is "yes", the loop will begin anew with the selection of the impulse.

If the answer to the inquiry is "no", the next smallest impulse is selected. The impulse width of this impulse is set as the first summated impulse. Subsequently, the residual range, i.e. the range that is still present when the summated impulse is subtracted from the clock cycle, is calculated.

A further inquiry starts as to whether an impulse is present so that the pulse width PW is smaller than the residual range.

If the answer to the inquiry is "no", the activation times and the deactivation times of the individual impulses of the summated impulse can be determined. The inventive procedure involves the total summated impulse is located at the middle of a clock cycle.

If the answer to the inquiry is "yes", the impulse is selected and a new summated impulse is calculated as the sum of the old summated impulse plus the pulse width of the selected impulse.

The calculation of the residual range is started again with this new summated impulse and the loop is run through again.

If no more impulses are found that will fit in the residual range available, a check is performed as to whether all impulses have already been selected.

If this is the case, the process ends. If the answer to the inquiry is "no", the next smallest impulse not yet selected will be selected and the loop run through again as of this point.

Figure 3:
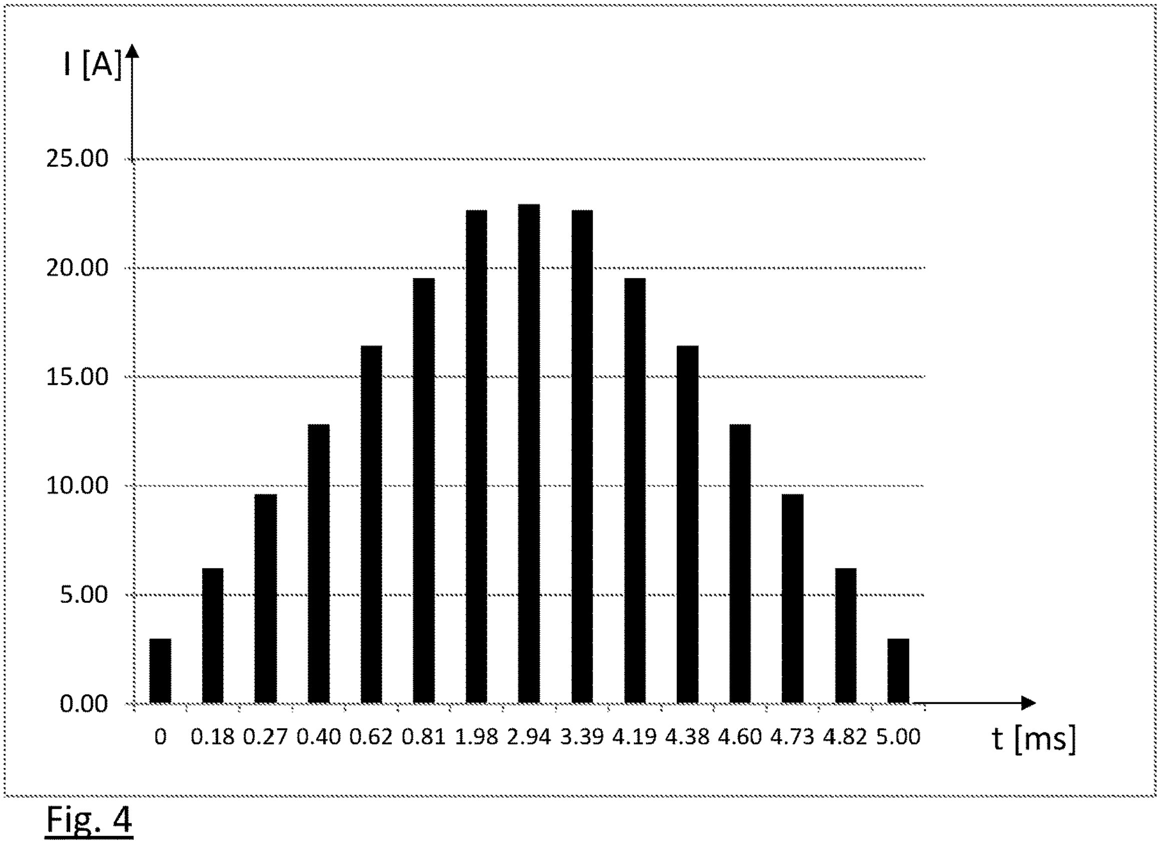
FIG. 3 is shows a typical current flow of an LED field over a clock cycle.

FIG. 3 shows a typical current flow of an LED field triggered in accordance with the invention over a clock cycle.

For certain applications of LED fields, in headlamps for instance, a light distribution with different luminance levels is desired. For this reason, every LED is actuated individually. By targeted activation and deactivation of the individual LEDs, it is possible to set a desired middle luminance of the LED.

In such a case, the LED with a desired luminance of 100% is energized for the entire clock cycle.

The LEDs with other desired luminances are deactivated again after reaching the desired middle luminance already before the end of the clock cycle.

For LEDs with a desired luminance of less than 100%, this gives rise to the possibility of shifting the activation time and the deactivation time within the clock cycle.

In accordance with the present invention, FIG. 3 shows a current flow in which the impulses of the individual LEDs are chronologically arranged so that the activation and deactivation times overlap as little as possible.

In this context, FIG. 3 shows a current distribution over a clock cycle for 8 LEDs, selected as an example, with the impulse widths shown in the following Table 1.

TABLE 1

| LED | 8 | 7 | 6 | 5 | 4 | 3 | 2 | 1 |
|---|---|---|---|---|---|---|---|---|
| PW in % | 84.00 | 100.00 | 92.62 | 89.03 | 75.00 | 67.74 | 38.62 | 17.75 |

The operation of the LEDs is timed such that the maximum occurs in the middle of the clock cycle in order to minimize undesired current spikes at the beginning of a clock cycle.

FIG. 3 is based on the following temporal distribution of the LEDs.

In context of Table 2 below, 1 stands for a closed controllable switching element so that the selected LED is energized and 0 stands for an opened controllable switching element.

TABLE 2

| Zeit t[ms] | 8 | 7 | 6 | 5 | 4 | 3 | 2 | 1 |
|---|---|---|---|---|---|---|---|---|
| 0 | 0 | 1 | 0 | 0 | 0 | 0 | 0 | 0 |
| 0.18 | 0 | 1 | 1 | 0 | 0 | 0 | 0 | 0 |
| 0.27 | 0 | 1 | 1 | 1 | 0 | 0 | 0 | 0 |
| 0.40 | 1 | 1 | 1 | 1 | 0 | 0 | 0 | 0 |
| 0.62 | 1 | 1 | 1 | 1 | 1 | 0 | 0 | 0 |
| 0.81 | 1 | 1 | 1 | 1 | 1 | 1 | 0 | 0 |
| 1.98 | 1 | 1 | 1 | 1 | 1 | 1 | 1 | 0 |
| 2.94 | 1 | 1 | 1 | 1 | 1 | 1 | 0 | 1 |
| 3.39 | 1 | 1 | 1 | 1 | 1 | 1 | 1 | 0 |
| 4.19 | 1 | 1 | 1 | 1 | 1 | 1 | 0 | 0 |
| 4.38 | 1 | 1 | 1 | 1 | 1 | 0 | 0 | 0 |
| 4.60 | 1 | 1 | 1 | 1 | 0 | 0 | 0 | 0 |
| 4.73 | 0 | 1 | 1 | 1 | 0 | 0 | 0 | 0 |
| 4.82 | 0 | 1 | 1 | 0 | 0 | 0 | 0 | 0 |
| 5.00 | 0 | 1 | 0 | 0 | 0 | 0 | 0 | 0 |

Figure 4:
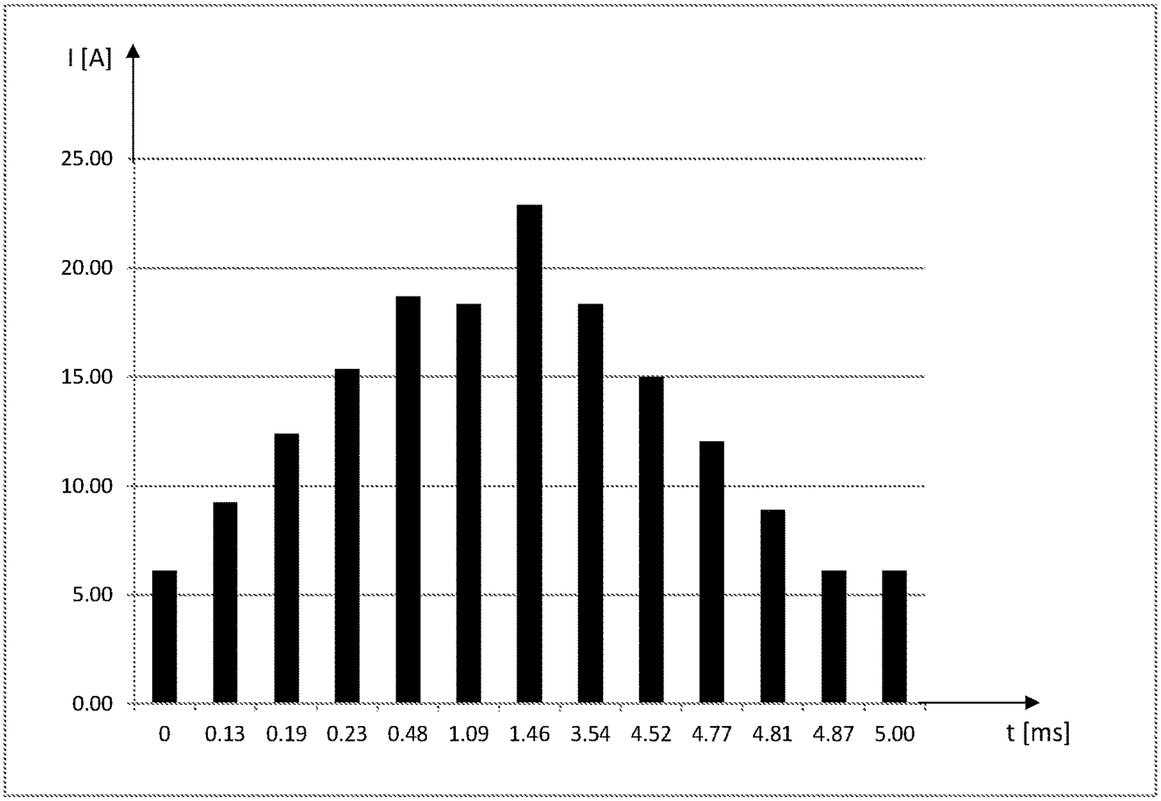
FIG. 4 is shows a typical current flow of an LED field over a clock cycle with a modified activation time and energization level.

FIG. 4 shows a typical current flow of an LED field actuated in accordance with the invention over a clock cycle with a modified activation time and energization level.

For the eventuality that no LED in an LED field is intended to each a luminance of 100%, it would be entirely conceivable to distribute the impulse for every LED over one clock cycle as shown in FIG. 3.

In order to optimize the current consumption and the dynamism of the overall current, the current flow shown in FIG. 4 involves the actuation of the LEDs being performed as follows.

The LED with the highest activation period is set to 100% of the activation time within a clock cycle and, at the same time, the energization level for this LED is reduced by this factor.

The effective luminance of the LED remains the same with this procedure.

The other LEDs are correspondingly energized longer by the same factor. The current required is multiplied by the reciprocal factor and thus decreased.

The activation and deactivation times for the LEDs from an LED field are not determined until this procedure has been completed. In accordance with the invention, the same procedure can be carried out as described in FIG. 3.

In this context, FIG. 4 shows a current distribution over a clock cycle for 8 LEDs, selected as an example, after the impulse width and the current requirement has been adjusted with the impulse widths shown in the following Table 3.

TABLE 3

| LED | 8 | 7 | 6 | 5 | 4 | 3 | 2 | 1 |
|---|---|---|---|---|---|---|---|---|
| PW in % | 90.70 | 96.13 | 100.00 | 96.13 | 80.98 | 75.58 | 41.70 | 19.17 |

The individual LEDS are, where possible, arranged in series so that the activation and deactivation times overlap as little as possible.

FIG. 4 results from the following temporal distribution of the LEDs within a clock cycle.

TABLE 4

| Zeit t[ms] | 8 | 7 | 6 | 5 | 4 | 3 | 2 | 1 |
|---|---|---|---|---|---|---|---|---|
| 0 | 0 | 1 | 1 | 0 | 0 | 0 | 0 | 0 |
| 0.13 | 0 | 1 | 1 | 0 | 0 | 0 | 0 | 1 |
| 0.19 | 0 | 1 | 1 | 1 | 0 | 0 | 0 | 1 |
| 0.23 | 1 | 1 | 1 | 1 | 0 | 0 | 0 | 1 |
| 0.48 | 1 | 1 | 1 | 1 | 1 | 0 | 0 | 1 |
| 1.09 | 1 | 1 | 1 | 1 | 1 | 1 | 0 | 0 |
| 1.46 | 1 | 1 | 1 | 1 | 1 | 1 | 1 | 0 |
| 3.54 | 1 | 1 | 1 | 1 | 1 | 1 | 0 | 0 |
| 4.52 | 1 | 1 | 1 | 1 | 0 | 1 | 0 | 0 |
| 4.77 | 0 | 1 | 1 | 1 | 0 | 1 | 0 | 0 |
| 4.81 | 0 | 0 | 1 | 1 | 0 | 1 | 0 | 0 |
| 4.87 | 0 | 0 | 1 | 1 | 0 | 0 | 0 | 0 |
| 5.00 | 0 | 1 | 1 | 0 | 0 | 0 | 0 | 0 |

In the context of Table 4 above, 1 stands for a closed controllable switching element so that the selected LED is energized and 0 stands for an opened controllable switching element.

The advantage of this approach is a reduced dynamism of the overall current and in the peak current.

Figure 5A:
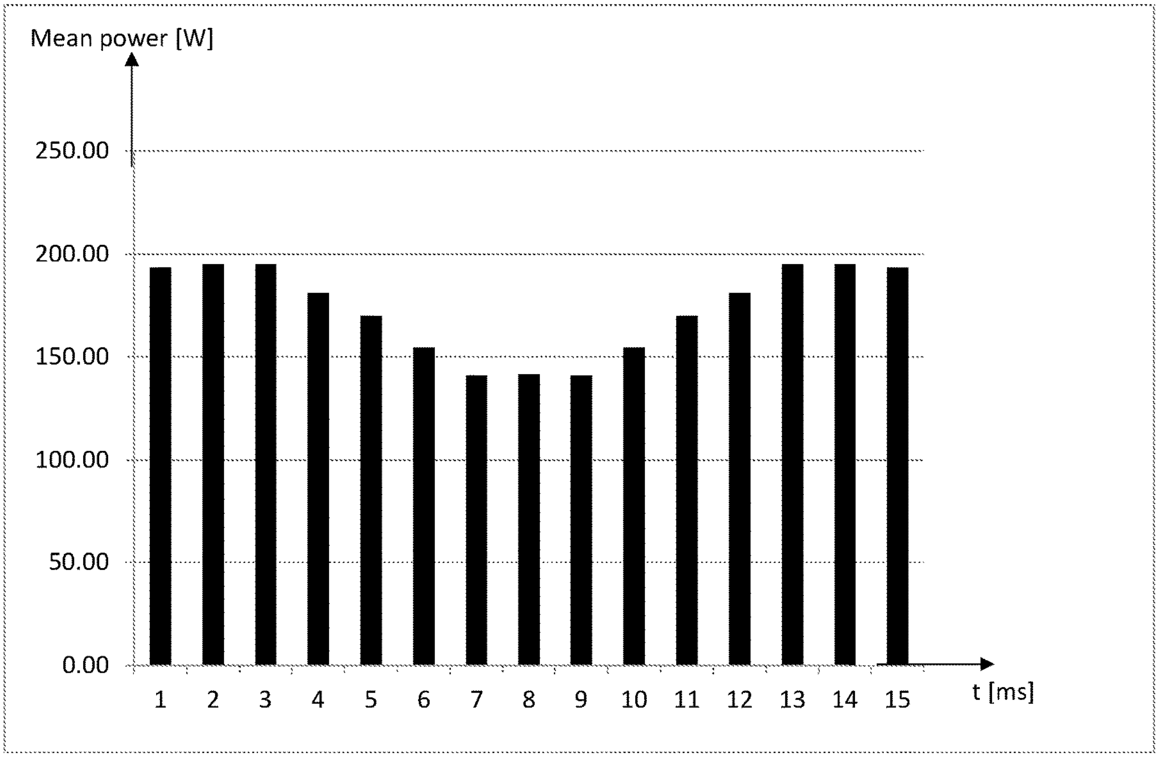
FIGS. 5*a* and 5*b* show a comparison of typical power distributions in an LED field with three groups without any shift in the beginning of a clock cycle (a) and with a shift in the beginning of a clock cycle (b).
Figure 5B:
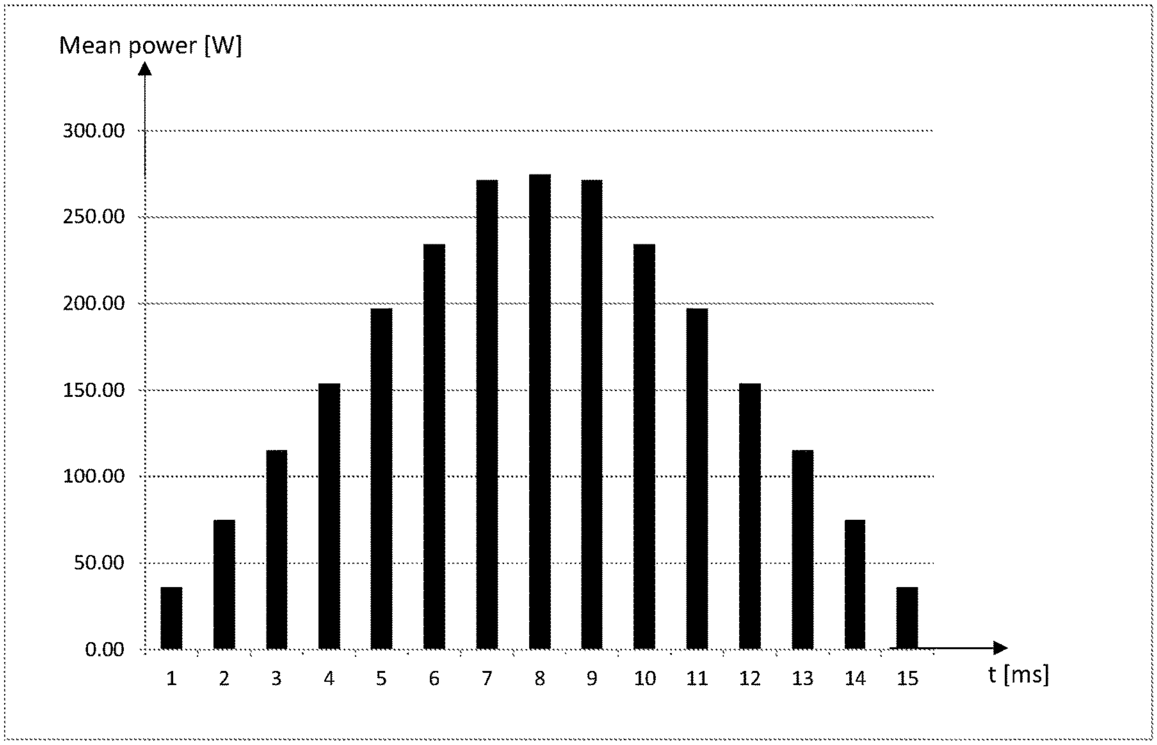

Further optimization is shown in FIG. 5*a* and FIG. 5*b*. The Figures show the power distribution of one LED field with three groups. In this respect, each group within the LED field shows a similar current flow as already described in FIG. 3.

In this context, FIG. 5*a* shows the case where all groups use the same time as the beginning of their respective clock cycle. The power consumption of each group within the LED field is aggregated. In the present example of FIG. 5*a*, peak power consumptions of up to 270 W occur at the input of this circuit.

FIG. 5*b* shows the case where the beginning of a clock cycle for each group is staggered by a time interval Δt. Here, the groups are triggered each staggered by one third of a clock cycle.

This gives rise to the power distribution shown in FIG. 5*b*.

Figure 6:
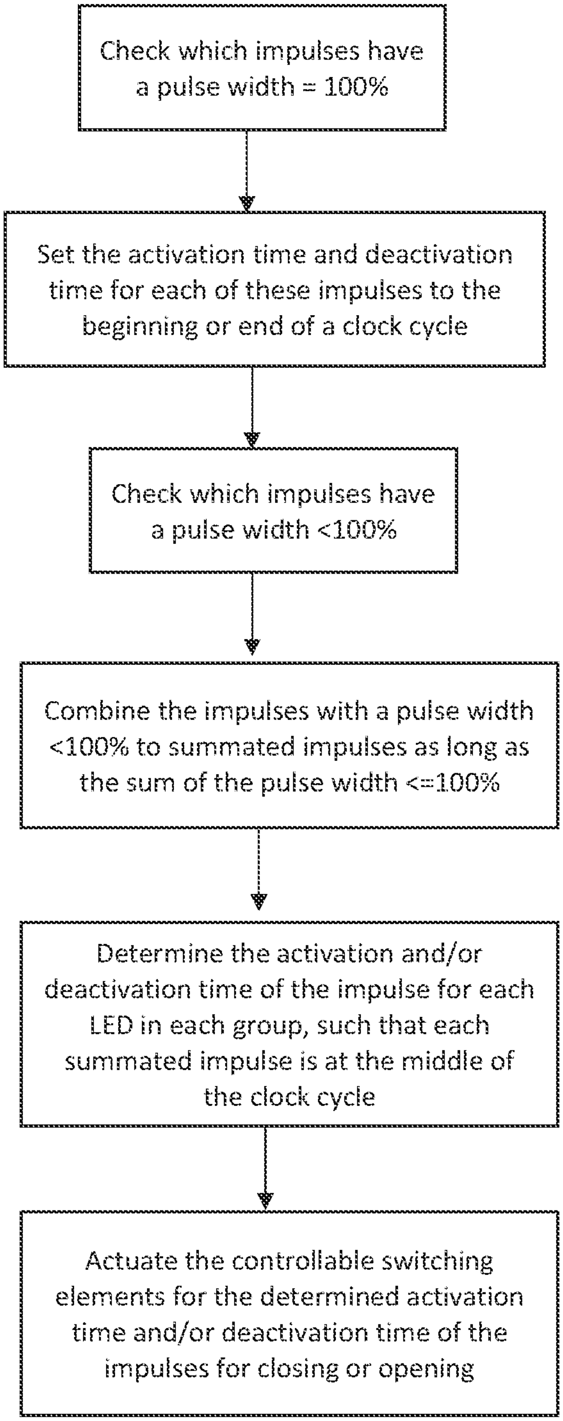
FIG. 6 is a flow diagram to demonstrate the procedure for operating an inventive circuit arrangement.

As shown in FIG. 6, the procedure for operating an inventive circuit arrangement features at least the following steps: the control and/or regulating system 9 checks which impulses have a pulse width=100%, the activation time and the deactivation time for each of these impulses is set to the beginning or the end of a clock cycle, the control and/or regulating system 9 checks which impulses have a pulse width <100%, impulses with pulse widths <100% can be combined to summated impulses as long s the sum of the pulse width <=100%, the control and/or regulating system 9 determines the activation time and/or deactivation time of the impulse for each LED 3 in each group such that the summated impulse is at the middle of a clock cycle, and the control and/or regulating system 9 actuates the controllable switching elements 5 for the determined activation time and/or deactivation time of the impulses for closing or opening.

The overlapping of the three staggered groups in this example results in a maximum input power of only 190 W. Likewise, the course of the power distribution is more even.

The inventive actuation of several groups within an LED field has a positive effect on power consumption.

LIST OF REFERENCE NUMBERS

1, 2 Series circuits
3 Diode
4 Resistor
5 Controllable switching element
6 Circuit arrangement
7 LED field
8 Current source
9 Control and/or regulating system
10 Outputs

The invention claimed is:

1. A control or regulating method for controlling or regulating a light emitting diode (LED) field with n LEDs, wherein the n LEDs are a number of LEDs of the LED field, wherein n≥2, wherein the LED field includes outputs at which control signals or regulating signals for controlling or regulating controllable switching elements are tapped, the method comprising steps of:

defining activation times and deactivation times of impulses through the control signals or the regulating signals using a control or regulating system connected to the LED field; and actuating at least one of the controllable switching elements to close or open during the impulses using the control or regulating system, wherein the control signals or the regulating signals instruct the controllable switching elements to close or open, wherein the n LEDs are activated and deactivated according to whether the controllable switching elements are closed or open, wherein each of the n LEDs is allocated to one of a number of k groups such that each of the k groups contains $m_j$ LEDS, where 1≤j≤k and $\Sigma_{j=1}^{k} m_j=n$ apply, wherein the activation times and the deactivation times of the impulses of the LEDs of each of the k groups is determined by the control or regulating system based on a pulse width or an amplitude of the impulses, wherein the activation and deactivation time of the impulse for each LED of each k group is based on the reference time $a_j=a_1 \ldots a_k$ such that $1\leq p_j\leq m_j$.

2. The control or regulating method in accordance with claim 1, wherein a luminance of each of the $m_j$ LEDs of the k groups is controlled by setting the pulse width of the impulses from 0-100% of a clock cycle or setting the amplitude of the impulses.

3. The control or regulating method in accordance with claim 1, wherein the activation time and the deactivation time of the impulses can be determined for each of the $m_j$ LEDs of the k groups depending on the pulse width or the amplitude of the impulses.

4. The control or regulating method in accordance with claim 1, wherein the defined activation times and deactivation times of the impulses are within a specified clock cycle.

5. The control or regulating method in accordance with claim 1, wherein using the control or regulating system, to determine the impulses which have a pulse width=100%, wherein the activation time and the deactivation time for each of the impulses can be defined at a beginning or an end of a clock cycle, to determine the impulses which have a pulse width of <100%, the impulses with pulse widths <100% can be combined to summated impulses as long as a sum of the pulse widths <=100%, the activation times and deactivation time of the impulses for each LED in each group can be specified such that the summated impulse is at the middle of the clock cycle.

6. The control or regulating method in accordance with claim 1, wherein the number of the k groups amounts to $2 \leq k \leq n$ and the beginning of a clock cycle can be actuated at staggered time intervals $\Delta t_2 \ldots \Delta t_k$.

7. The control or regulating method in accordance with claim 6, wherein a time period Δt can be determined using an equation Δt=Taktperiode/k.

8. A circuit arrangement for controlling or regulating a light emitting diode (LED) field with n LEDs, wherein n>2, and the n LEDs are a number of LEDs of the LED field, wherein each of the LEDs is allocated to one of a number of k groups such that the LEDs allocated to a particular k group are controlled together, and such that each of the k groups contains $m_j$ LEDs, wherein $1 \leq j \leq k$ and $\Sigma_{j=1}^{k} m_j = n$ apply, the arrangement comprising:

a control or regulating system designed to define activation times and deactivation times of impulses at a beginning of a clock cycle or an end of the clock cycle by actuating a controllable switching element allocated to an LED based on a summated impulse, wherein the summated impulse is a combination of the impulses with pulse widths <100%;

a current source connected to a second output of the control or regulating system; and the LED field, wherein the LED field comprises at least two series circuits each of which comprises at least one LED and the controllable control element allocated to the LED, wherein a control connection of the controllable switching element is connected to a first output of the control or regulating system, wherein the summated impulse lies at a middle of the clock cycle, as specified by the control or regulating system.

9. The circuit arrangement in accordance with claim 8, wherein the current source can be regulated by the control or regulating system such that the current source corresponds to a current requirement of the LEDs allocated to the controllable switching elements which are closed.

10. The circuit arrangement in accordance with claim 8, wherein the LED field is divided into $2 \leq k \leq n$ groups, and wherein the LEDs of each k group are activated and deactivated at the same time.

11. A procedure for operating a circuit arrangement for controlling or regulating a light emitting diode (LED) field using a control or regulating system, the procedure comprising steps of:

checking which impulses have a pulse width=100% using the control or regulating system;

setting an activation time and an deactivation time for each of the impulses to a beginning or an end of a clock cycle;

checking which of the impulses have a pulse width <100% using the control or regulating system;

combining the impulses with pulse widths <100% to summated impulses as long as a sum of the impulses has a pulse width <=100%;

determining the activation time and the deactivation time of the impulse for each LED of the LED field using the control or regulating system, such that the summated impulse is at middle of the clock cycle; and actuating controllable switching elements using the control or regulating system for the determined activation time and deactivation time of the impulses for closing or opening, wherein a number of LEDs of the LED field is n LEDS, and each of the n LEDs is allocated to one of a number of k groups such that each of the k groups contains $m_j$ LEDS, where $1 \leq j \leq k$ and $\Sigma_{j=1}^{k} m_j = n$ apply, and wherein n>2.

12. The procedure for operating a circuit arrangement in accordance with claim 11, further comprising the step of:

regulating a current source of the control or regulating system such that the current source corresponds to a current requirement of the LEDs connected to the closed controllable switching elements.

13. The procedure for operating a circuit arrangement in accordance with claim 11, wherein the LED field is divided into $2 \leq k \leq n$ groups, wherein n LEDs are a number of LEDs of the LED field, and the n LEDs are allocated to one of a k group, such that LEDs of each k group are activated and deactivated at the same time by the control or regulating system.

14. The procedure for operating a circuit arrangement in accordance with claim 11, wherein a luminance of each of the LEDs of the LED field is controlled by setting the pulse width of the impulses from 0-100% of the clock cycle or setting an amplitude of the impulses.

15. The procedure for operating a circuit arrangement in accordance with claim 11, wherein the activation time and the deactivation time of the impulses can be determined for each of the LEDs of the LED field depending on the pulse width or an amplitude of the impulses.

16. The procedure for operating a circuit arrangement in accordance with claim 11, wherein the determined activation times and deactivation times of the impulses are within a specified clock cycle.

17. The procedure for operating a circuit arrangement in accordance with claim 11, wherein the number of the k groups amounts to $2 \leq k \leq n$, and the beginning of the clock cycle can be actuated at staggered time intervals $\Delta t_2 \ldots \Delta t_k$.

18. The procedure for operating a circuit arrangement in accordance with claim 11, wherein a time period Δt can be determined using an equation Δt=Taktperiode/k.

* * * * *